(12) United States Patent
Chen

(10) Patent No.: US 9,906,053 B2
(45) Date of Patent: Feb. 27, 2018

(54) ENERGY STORAGE DEVICE AND CONTROL METHOD THEREOF

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 196 days.

(21) Appl. No.: 15/089,089

(22) Filed: Apr. 1, 2016

(65) Prior Publication Data

US 2017/0117727 A1    Apr. 27, 2017

(30) Foreign Application Priority Data

Oct. 26, 2015   (TW) .............................. 104135072 A

(51) Int. Cl.
*H02J 7/00*   (2006.01)
*G06F 1/26*   (2006.01)

(52) U.S. Cl.
CPC ............ *H02J 7/0029* (2013.01); *G06F 1/266* (2013.01); *H02J 7/0068* (2013.01); *H02J 7/0083* (2013.01)

(58) Field of Classification Search
CPC .................................................. H02J 7/0029
USPC ......................................................... 320/107
See application file for complete search history.

(56) References Cited

U.S. PATENT DOCUMENTS

| | | | |
|---|---|---|---|
| 7,002,265 B2* | 2/2006 | Potega ................. | B60L 11/185 307/149 |
| 2003/0141845 A1* | 7/2003 | Krieger ................. | H02J 7/0054 320/132 |
| 2017/0279352 A1* | 9/2017 | Kosaraju .......... | G01R 19/16571 |
| 2017/0308152 A1* | 10/2017 | Trichy .................. | G06F 1/3287 |

* cited by examiner

*Primary Examiner* — Suresh Memula
(74) *Attorney, Agent, or Firm* — Li & Cai Intellectual Property (USA) Office

(57) ABSTRACT

An energy storage device capable of receiving energy using an energy input interface or charging an electronic device using an energy output interface. The energy storage device includes an adapter, an energy storage unit and a charger module. The adapter provides the charger module with an input current, and the charger module provides the energy storage unit with a first current. Otherwise, the charger module provides the electronic device with the input current. When the input current provided by the adapter is higher than a maximum safe current of the adapter, the energy storage unit provides the charger module with a second current. The charger module outputs energy to the electronic device according to the second current to assist the adapter to charge the electronic device. The second current is opposite to the first current.

14 Claims, 4 Drawing Sheets

//ENERGY STORAGE DEVICE AND
CONTROL METHOD THEREOF

BACKGROUND

1. Technical Field

The present disclosure generally relates to an energy storage device and, more particularly, to an energy storage device with short response time and a control method thereof.

2. Description of Related Art

With the development of technology, portable electronic devices, such as mobile phones, tablet computers, music players, media players and the like using universal serial bus (USB) interfaces, have become indispensable in our daily life.

Since portable electronic devices consume electricity very much, the users may bring an energy storage device (for example, a mobile power bank) to charge the portable electronic devices. The energy storage device is usually compatible with the On-The-Go (OTG) standard. In other words, the energy storage device may be a peripheral powered by other devices such as a desktop computer, or a host device capable of charging an electronic device connected thereto. Moreover, in recent years, an energy storage device has been developed to charge an electronic device connected thereto, while being charged by the utility at the same time.

Furthermore, the energy storage device includes a buck circuit and a boost circuit. When the energy storage device is to charge a battery therein, the energy storage device switches to the buck circuit so as to level down the utility voltage to an adequate voltage. On the other hand, when the energy storage device is to charge an electronic device, the energy storage device switches to the boost circuit so as to level up the voltage provided by the battery to another adequate voltage. In other words, the conventional energy storage device uses a buck circuit and a boost circuit to achieve the function.

Operation principles of the conventional energy storage device are described as follows, for example. Upon receiving the utility, an adapter in the conventional energy storage device provides a maximal current of 1 A. However, the charging current of an electronic device is 1.5 A. In other words, the adapter cannot supply the electronic device. Meanwhile, the energy storage device switches to the boost circuit so that the battery provides the electronic device with energy to meet the requirement of the electronic device. In brief, in addition to the maximal current of 1 A from the adapter, the battery provides a current of 0.5 A so that the electronic device receives a total current of 1.5 A.

However, the conventional energy storage device has a few drawbacks. One is that the battery can only provide a fixed current. For example, as the load of the electronic device decreases, the electronic device only requires a current of 1.2 A. Meanwhile, the battery still provides the electronic device with a fixed current of 0.5 A, so that the adapter only provides the electronic device with a current of 0.7 A. Since the output current of the adapter becomes smaller, a controller of the conventional energy storage device determines that the adapter can meet the requirements of the electronic device and thus turns off the boost circuit and switches back to the buck circuit to charge the battery. In fact, the adapter cannot provide the electronic device with sufficient energy, and thus the conventional energy storage device switches again to the boost circuit so that the battery outputs energy. In brief, the conventional energy storage device switches between the boost circuit and the buck circuit, which causes instability of the conventional energy storage device, and fails to provide the electronic device with energy.

Moreover, another drawback of the conventional energy storage device is longer response time. It takes time for the conventional energy storage device to generate a control signal based on the present conditions to control the switching between the buck circuit and the boost circuit. In other words, the time for the conventional energy storage device to generate the control signal causes the conventional energy storage device to fail to respond to the request of the electronic device in real time, which increases the response time.

SUMMARY

One embodiment of the present disclosure provides an energy storage device. The energy storage device includes at least one energy input interface and at least one energy output interface. The energy storage device receives energy using the energy input interface or charges an electronic device using the energy output interface. The energy storage device includes an adapter, an energy storage unit and a charger module. The adapter is coupled to the energy input interface. The charger module is coupled to the adapter, the energy storage unit and the energy output interface. The adapter provides an input current. The energy storage unit stores energy or provides energy. The charger module receives the input current and supplies a first current to the energy storage unit to charge the energy storage unit. Otherwise, the charger module supplies the input current to the electronic device to charge the electronic device. When the input current provided by the adapter is higher than or equal to a maximum safe current of the adapter, the charger module operates in a boost mode, and the energy storage unit supplies a second current to the charger module. The charger module outputs energy to the electronic device according to the second current to assist the adapter to charge the electronic device. The second current is reverse to the first current.

One embodiment of the present disclosure further provides a control method of an energy storage device. The energy storage device includes at least one energy input interface and at least one energy output interface. The energy storage device receives energy using the energy input interface or charges an electronic device using the energy output interface. The control method includes the steps herein. In Step A, an adapter is used to provide an input current. In Step B, it is determined whether the input current provided by the adapter is higher than or equal to a maximum safe current of the adapter. In Step C, when the input current provided by the adapter is lower than the maximum safe current, a charger module is used to charge the electronic device and supply a first current to an energy storage unit to charge the energy storage unit. In Step D, when the input current provided by the adapter is higher than or equal to the maximum safe current, the energy storage unit supplies a second current to the charger module so that the charger module outputs energy to the electronic device according to the second current to assist the adapter to charge the electronic device. The second current is reverse to the first current.

As stated above, the present disclosure provides an energy storage device and a control method thereof, using a control charger module to achieve assisting the adapter to charge the electronic device. Therefore, the energy storage device according to the present disclosure does not require a buck circuit and a boost circuit as in the conventional energy storage device. Compared to the conventional energy storage device operating based on a control signal to control the switching between the buck circuit and the boost circuit, the energy storage device according to the present disclosure does not require the switching between the buck circuit and the boost circuit to respond to the request of an electronic device. In other words, the energy storage device according to the present disclosure exhibits less response time and good stability of operation.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

Figure 1:
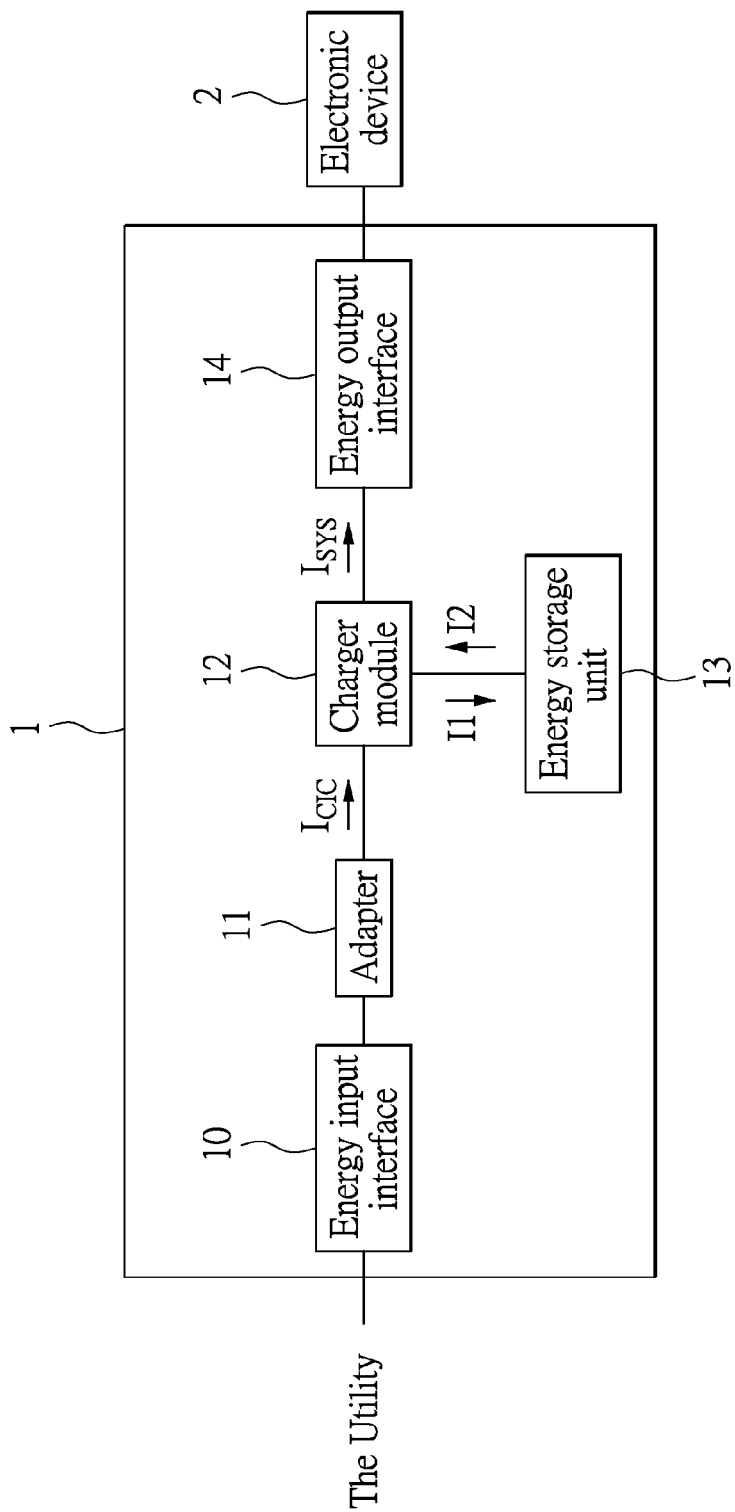
FIG. 1 is a schematic diagram of an energy storage device according to one embodiment of the present disclosure.

Referring to FIG. 1, FIG. 1 is a schematic diagram of an energy storage device according to one embodiment of the present disclosure. The energy storage device 1 includes at least one energy input interface 10, an adapter 11, a charger module 12, an energy storage unit 13 and at least one energy output interface 14. The adapter 11 is coupled to the energy input interface 10 and the charger module 12. The charger module 12 is coupled to the energy storage unit 13 and the energy output interface 14. Moreover, the electronic device 2 is coupled to the energy output interface 14. The energy storage device 1 is, for example, a mobile power pack compatible with the On-The-Go (OTG) standard. In other words, the energy storage device 1 receives electricity from the utility and stores energy therein. Also, the energy storage device 1 provides other electronic devices with electricity.

The electronic device 2 is, for example, a mobile phone, a tablet computer, a music player or an audio/video player and the like using universal serial bus (USB) interfaces, to which the present disclosure is not limited. The electronic device 2 receives an output current $I_{SYS}$ provided by the charger module 12 through the energy output interface 14 and is charged according to the output current $I_{SYS}$.

The energy input interface 10 is, for example, a USB interface for receiving electricity from the utility and inputting the electricity from the utility into the adapter 11. It should be noted that, in the present embodiment, the energy storage device 1 only includes an energy input interface 10, to which, however, the present disclosure is not limited. In other embodiments, the energy storage device 1 may also include a plurality of energy input interfaces 10. In other words, the energy storage device 1 may provide faster charging using the plurality of energy input interfaces 10. For better understanding, the energy storage device 1 is exemplified by using an energy input interface 10.

Similarly, the energy output interface 14 is, for example, a USB interface for outputting the energy stored in the energy storage device 1 to a corresponding electronic device 2. In the present embodiment, the energy storage device 1 only includes an energy output interface 14, to which, however, the present disclosure is not limited. In other embodiments, the energy storage device 1 may also include a plurality of energy output interfaces 14. Each of the energy output interfaces 14 is coupled to an electronic device. In other words, the energy storage device 1 may charge a plurality of electronic devices 2 through a plurality of energy output interfaces 14 at the same time. For better understanding, the energy storage device 1 is exemplified by using an energy output interface 14.

The energy storage unit 13 is, for example, a battery for storing the received energy or converting the energy stored therein into electricity to be supplied to the electronic device 2.

The adapter 11 includes adequate logic circuits and/or coding for stepping up or stepping down the utility voltage according to Faraday's law of electromagnetic induction and generating an input current $I_{CIC}$.

The charger module 12 receives the input current $I_{CIC}$ and charges the energy storage unit 13 or the electronic device 2 according to whether the energy storage device 1 operates in a boost mode or a buck mode. More particularly, when the charger module 12 operates in the buck mode, the charger module 12 provides the energy storage unit 13 and the electronic device 2 with energy according to the input current $I_{CIC}$ simultaneously. If the energy storage unit 13 is fully loaded and cannot store more energy, the charger module 12 only charges the electronic device 2. On the other hand, when the charger module 12 operates in the boost mode, the charger module 12 provides the electronic device 2 with input current $I_{CIC}$ and the energy storage unit 13 also provides the electronic device 2 with energy. Then, the charger module 12 supplies the output current $I_{SYS}$ to meet the energy requirements of the electronic device 2.

Figure 2:
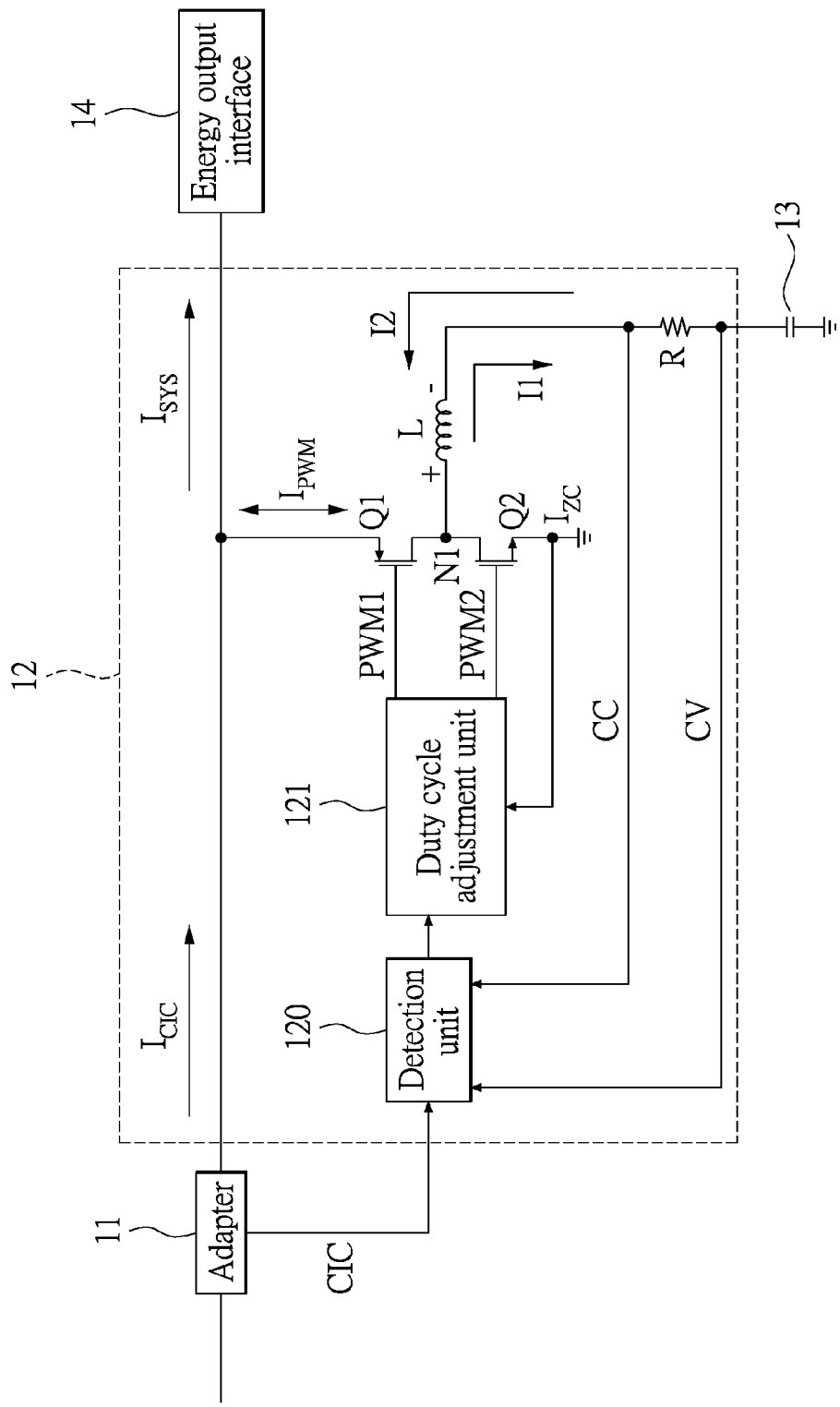
FIG. 2 is a schematic diagram of a charger module according to one embodiment of the present disclosure.

To further describe the configuration of the charger module 12, please refer to FIG. 2, which is a schematic diagram of a charger module according to one embodiment of the present disclosure. The charger module 12 includes a detection unit 120, a duty cycle adjustment unit 121, a first switch Q1, a second switch Q2, an inductor L and a resistor R. The detection unit 120 is coupled to the adapter 11 and the resistor R. The duty cycle adjustment unit 121 is coupled to the detection unit 120, the gate of the first switch Q1 and the gate of the second switch Q2. The first switch Q1 is coupled to the adapter 11, the energy output interface 14 and a first terminal of the inductor L. The second switch Q2 is coupled to the first switch Q1 and the first terminal of the inductor L. A second terminal of the inductor L is coupled to a first terminal of the resistor R. A second terminal of the resistor R is coupled to a first terminal of the energy storage unit 13. A second terminal of the energy storage unit 13 is grounded.

In the present embodiment, the first switch Q1 is a p-channel metal-oxide-semiconductor field-effect transistor (PMOSFET), and the second switch Q2 is an n-channel metal-oxide-semiconductor field-effect transistor (NMOSFET), to which, however, the present disclosure is not limited. In other embodiments, the first switch Q1 and the second switch Q2 may also be configured using any combination of a PMOSFET or an NMOSFET.

The source of the first switch Q1 is coupled to the adapter 11 so as to receive the input current $I_{CIC}$ provided by the adapter 11. The drain of the first switch Q1 is coupled to a first node N1. Moreover, the first terminal of the inductor L is also coupled to the first node N1. The drain of the second switch Q2 is coupled to the first node N1, while the source of the second switch Q2 is grounded.

The current flowing through the inductor L depends on how the first switch Q1 and the second switch Q2 operate. In other words, the duty cycle of the control first switch Q1 and the duty cycle of the second switch Q2 control the first current I1 flowing to the energy storage unit 13 or the first current I2 provided by the energy storage unit 13.

The detection unit 120 includes adequate logic circuits and/or coding for detecting the input current $I_{CIC}$ provided by the adapter 11 and generating an input current value signal CIC. The input current value signal CIC indicates the intensity of the input current $I_{CIC}$. Moreover, the detection unit 120 is coupled to both terminals of the resistor R so as to acquire the charging current CC at the first terminal of the energy storage unit 13 and the storage voltage CV stored in the energy storage unit 13. The charging current CC may be the first current I1 flowing to the energy storage unit 13 or the second current I2 outputted from the energy storage unit 13. Then, the detection unit 120 controls the duty cycle adjustment unit 121 according to the detected input current value signal CIC, the charging current CC and the storage voltage CV.

More particularly, the detection unit 120 can be implemented using a plurality of comparators. The first comparator compares the intensity of the input current value signal CIC and outputs a first comparison signal. The second comparator compares the intensity of the charging current CC and outputs a second comparison signal. The third comparator compares the intensity of the storage voltage CV and outputs a third comparison signal. The duty cycle adjustment unit 121 correspondingly controls the first switch Q1 and the second switch Q2 according to the first comparison signal, the second comparison signal and the third comparison signal.

It should be noted that, in the present embodiment, the detection unit 120 detects the input current $I_{CIC}$ provided by the adapter 11. However, the present disclosure is not limited thereto. In other embodiments, the detection unit 120 may also detect the input voltage provided by the adapter 11 and operate according to the detected input voltage.

The duty cycle adjustment unit 121 includes adequate logic circuits and/or coding for adjusting the duty cycle of the first PWM signal PWM1 and the duty cycle of the second PWM signal PWM2 according to the detection result of the detection unit 120 so as to adjust the operations of the first switch Q1 and the second switch Q2. The first PWM signal PWM1 controls the first switch Q1, while the second PWM signal PWM2 controls the second switch Q2.

More particularly, the duty cycle adjustment unit 121 receives at least one of the first, the second, the third comparison signals provided by the detection unit 120 and generates a feedback signal EAO according to the logic level of the at least one of the first, the second, or the third comparison signals. Then, the duty cycle adjustment unit 121 compares the feedback signal EAO and a ramp signal RAMP to adjust the duty cycle of the first PWM signal PWM1 and the duty cycle of the second PWM signal PWM2 according to the comparison result.

For example, upon receiving the first comparison signal with a high logic level, the duty cycle adjustment unit 121 generates a feedback signal EAO with an analog level. Then, the feedback signal EAO and the ramp signal RAMP are compared so as to turn on or turn off the first switch Q1 and the second switch Q2.

When the operation mode of the charger module 12 changes, the intensity and the direction of the inductor current $I_L$ flowing through the inductor L also change. As a result, the intensity and the direction of the charger module current $I_{PWM}$ in FIG. 2 change. Furthermore, when the charger module 12 operates in the buck mode, the current through the inductor L is the first current I1 flowing from the first node N1 to the energy storage unit 13. When the charger module 12 operates in the boost mode, the current through the inductor L is the second current I2 flowing from the energy storage unit 13 to the first node N1. It should be noted that, in the present embodiment, the current from the first node N1 to the energy storage unit 13 is defined to be positive, while the current from the energy storage unit 13 to the first node N1 is defined to be negative.

In addition, the duty cycle adjustment unit 121 is further coupled to the source of the second switch Q2 to detect the current flowing through the source of the second switch Q2. The current flowing through the source of the second switch Q2 corresponds to the inductor current $I_L$ flowing through the inductor L. When the inductor current $I_L$ is a positive current, the current flowing through the source of the second switch Q2 is a positive current from the source to the first node N1. When the inductor current $I_L$ is a negative current, the current flowing through the source of the second switch Q2 is a negative current from the first node N1 to the ground terminal.

The duty cycle adjustment unit 121 records a zero-crossing current threshold $I_{ZC}$ for controlling the current flowing through the source of the second switch Q2. It is determined by the duty cycle adjustment unit 121 according to the zero-crossing current threshold $I_{ZC}$ whether there is any negative current allowable in the charger module 12. The zero-crossing current threshold $I_{ZC}$ changes with the change in the input current $I_{CIC}$ provided by the adapter 11. According to the zero-crossing current threshold $I_{ZC}$, the duty cycle adjustment unit 121 adjusts the duty cycle of the first PWM signal PWM1 and the duty cycle of the second PWM signal PWM2 so as to further control the intensity and the direction of the inductor current $I_L$. How the zero-crossing current threshold $I_{ZC}$ changes with the input current $I_{CIC}$ will be described herein.

Figure 3:
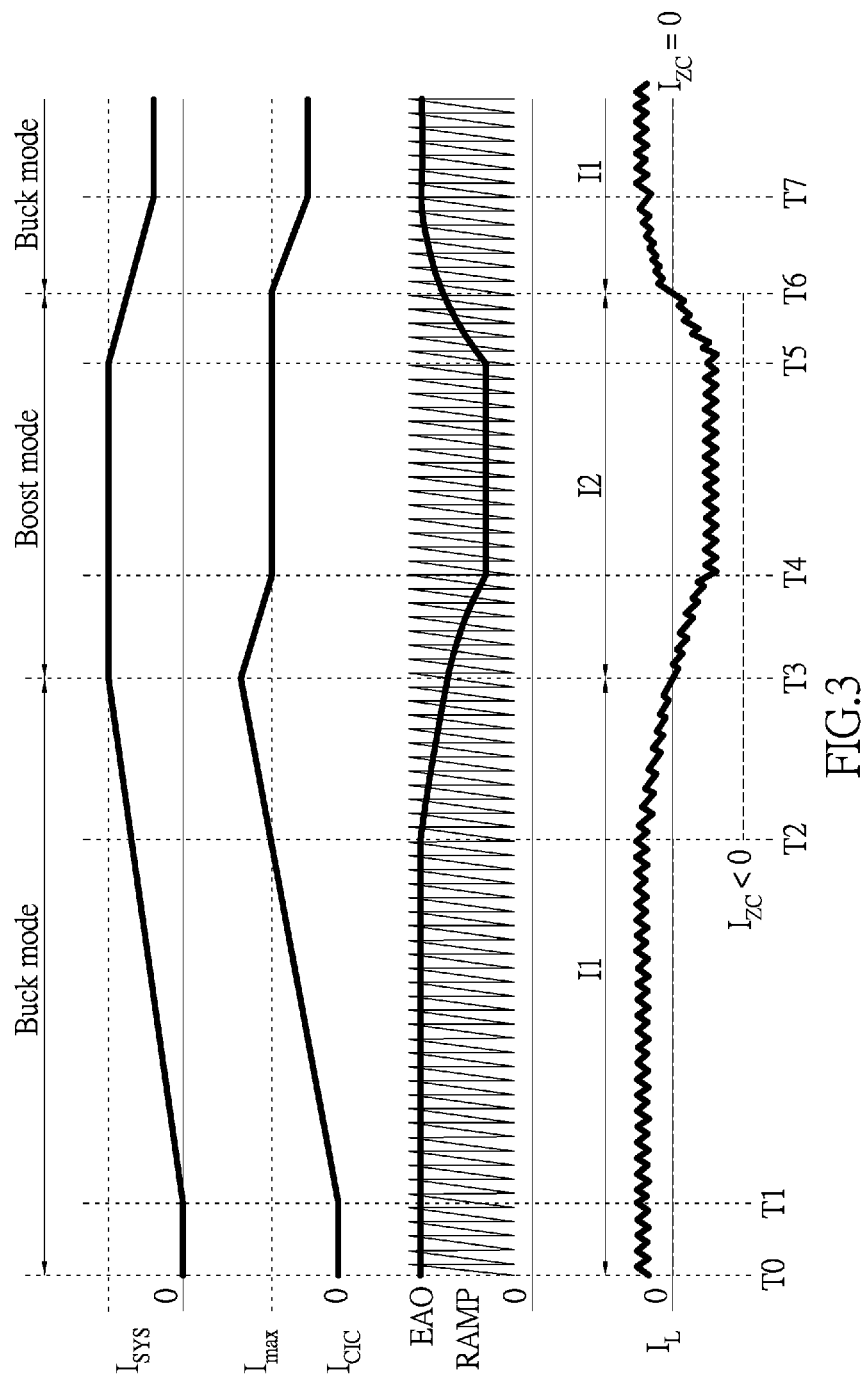
FIG. 3 is a waveform diagram of the voltage and the current of a charger module according to one embodiment of the present disclosure.

The operation principles of the charger module 12 will be described with reference with FIG. 2 and FIG. 3, wherein FIG. 3 is a waveform diagram of the voltage and the current of a charger module according to one embodiment of the present disclosure. At time T0, the energy storage device 1 is coupled to a device for connecting to the utility (for example, an electrical outlet), and the charger module 12 of the energy storage device 1 enters the buck mode. Upon receiving the utility, the adapter 11 supplies the input current $I_{CIC}$ to the charger module 12 to charge the energy storage unit 13.

The duty cycle adjustment unit 121 adjusts the intensity of the first current I1 flowing to the inductor L by controlling the duty cycle of the first switch Q1 and the duty cycle of the second switch Q2. In other words, the duty cycle adjustment unit 121 controls the first switch Q1 and the second switch Q2 to be turned on or off to operate as a buck circuit to charge the energy storage unit 13. At time T1, the charger module 12 is coupled to the electronic device 2 and the adapter 11 supplies the input current $I_{CIC}$ to the energy output interface 14 to charge the electronic device. If the energy storage unit 13 is fully loaded with energy, the duty cycle adjustment unit 121 turns off the first switch Q1 and the second switch Q2 to stop charging the energy storage unit 13. Meanwhile, the input current $I_{CIC}$ provided by the adapter 11 flows to the energy output interface 14 to supply the electronic device 2.

The input current $I_{CIC}$ provided by the adapter 11 increases as the load current required by the electronic device 2 increases. As long as the load current required by the electronic device 2 does not exceed the maximum safe current $I_{max}$ (for example, 1 A) provided by the adapter 11, the adapter 11 is capable of outputting the energy required by the electronic device 2 without the support from the energy storage unit 13. The maximum safe current $I_{max}$ is a maximum input current the adapter 11 can provide without being damaged.

Since the input current $I_{CIC}$ does not exceed the maximum safe current $I_{max}$, the analog level of the feedback signal EAO does not change. According to the feedback signal EAO and the ramp signal RAMP, the duty cycle adjustment unit 121 controls the turn-on time of the first switch Q1 and the turn-on time of the second switch Q2. When the first switch Q1 is turned on and the second switch Q2 is turned off, the electric potential at the first terminal N1 is equal to the electric potential at the source of the first switch Q1. Therefore, the slope of the inductor current $I_L$ is positive. When the first switch Q1 is turned off and the second switch Q2 is turned on, the electric potential at the first terminal N1 is equal to the electric potential at the source of the second switch Q2. Therefore, the slope of the inductor current $I_L$ is negative. The waveform of the inductor current $I_L$ is a sawtooth shape as shown in FIG. 3.

At time T2, the detection unit 120 detects that the input current $I_{CIC}$ provided by the adapter 11 has exceeded the maximum safe current $I_{max}$ the adapter 11 can provide, which indicates that the adapter 11 cannot provide the load current (for example, 1.2 A) required by the electronic device 2. To prevent the adapter 11 from being damaged due to too high energy output, the energy storage unit 13 assists to provide the energy required by the electronic device 2.

The detection unit 120 detects that the input current $I_{CIC}$ provided by the adapter 11 has exceeded the maximum safe current $I_{max}$ the adapter 11 can provide, which causes the analog level of the feedback signal EAO to decrease. The duty cycle adjustment unit 121 adjusts the duty cycle of the first PWM signal PWM1 and the duty cycle of the second PWM signal PWM2 according to the feedback signal EAO and the ramp signal RAMP, so that the first turn-on time of the first switch Q1 decreases, while the second turn-on time of the second switch Q2 increases. As the second turn-on time gradually becomes longer than the first turn-on time, the charger module 12 reduces the first current I1 supplied to the energy storage unit 13.

It should be noted that, if the input current $I_{CIC}$ is lower than the maximum safe current $I_{max}$, the duty cycle adjustment unit 121 does not allow the negative current. That is to say, the zero-crossing current threshold $I_{ZC}$ is zero, which means that there is no current flowing from node N1 to the source of the second switch Q2.

At time T3, the input current $I_{CIC}$ is higher than or equal to the maximum safe current $I_{max}$. The duty cycle adjustment unit 121 allows the current flowing from node N1 to the source of the second switch Q2, and adjusts the zero-crossing current threshold $I_{ZC}$ so that $I_{ZC}<0$. In other words, the inductor current $I_L$ can be directionally reversed. The direction of the current detected by the inductor L gradually changes. It should be noted that, meanwhile, zero-crossing current threshold $I_{ZC}$ is, for example, $-4\sim-5$ A.

The energy storage unit 13 provides the charger module 12 with energy, so that the second current I2 increases gradually. The inductor current $I_L$ through the inductor L turns to be a negative current, and the second current I2 through the first switch Q1 flows to the electronic device 2 to enter the boost mode. The second current I2 is, for example, 0.2 A.

As the energy storage unit 13 starts to assist the adapter 11 to provide the electronic device 2 with energy, the input current $I_{CIC}$ provided by the adapter 11 decreases. At time T4, the input current $I_{CIC}$ provided by the adapter 11 decreases to be equal to the maximum safe current $I_{max}$ to prevent the adapter 11 from being damaged. In the boost mode, the duty cycle adjustment unit 121 repeatedly outputs the first PWM signal PWM1 and the second PWM signal PWM2 so that the energy storage unit 13 stably supplies the second current I2 to the electronic device 2. Accordingly, the energy storage device 1 provides the electronic device 2 with sufficient electricity.

At time T5, the load current required by the electronic device 2 starts to fall (for example, the load current required by the electronic device 2 falls to 0.8 A). Meanwhile, the adapter 11 can provide the electronic device 2 alone with sufficient electricity. The analog level of the feedback signal EAO rises and the charger module 12 adjusts the duty cycle of the first PWM signal PWM1 and the duty cycle of the second PWM signal PWM2 according to the feedback signal EAO and the ramp signal RAMP so that the first turn-on time of the first switch Q1 increases, while the second turn-on time of the second switch Q2 decreases. As a result, the energy storage unit 13 reduces the second current I2 supplied to the charger module 12.

At time T6, the input current $I_{CIC}$ provided by the adapter 11 starts to fall due to load current required by the electronic device 2 decreases so that the input current $I_{CIC}$ falls below the maximum safe current $I_{max}$. It should be noted that, meanwhile, the duty cycle adjustment unit 121 does not allow the negative current. Therefore, the zero-crossing current threshold $I_{ZC}$ is adjusted to zero again.

Moreover, at time T7 when the adapter 11 charges the electronic device 2, the adapter 11 also charges the energy storage unit 13 at the same time to compensate for the energy loss of the energy storage unit 13 in the boost mode.

If the input current $I_{CIC}$ provided by the adapter 11 rises again to be higher than or equal to the maximum safe current $I_{max}$ of the adapter 11, the charger module 12 enters the boost mode again so that the energy storage unit 13 assists the adapter 11 to provide the electronic device 2 with sufficient energy.

As stated above, the charger module according to one embodiment of the present disclosure can operate in the buck mode and the boost mode to achieve the buck and the boost function of the conventional energy storage device. In other words, compared to the conventional energy storage device, the energy storage device of the present disclosure has advantages of lower manufacturing cost, easier circuit design and less circuit area.

Moreover, the energy storage device according to one embodiment of the present disclosure exhibits faster response and more stable. The reason is that it takes much time for the processor in the conventional energy storage device to analyze the present conditions and correspondingly output the control signal to control the switching between the buck circuit and the boost circuit. Therefore, the conventional energy storage device fails to respond to the request of the electronic device in real time, which leads to longer response time.

Moreover, the energy storage device 1 according to one embodiment of the present disclosure adjusts the energy provided by the energy storage unit 13 and the input current $I_{CIC}$ provided by the adapter 11 according to the present requirement of the electronic device 2. Furthermore, when the load current required by the electronic device 2 is too high, the energy storage unit 13 starts to provide the electronic device 2 with electricity and the adapter 11 adjusts the input current $I_{CIC}$ to be equal to the maximum safe current $I_{max}$. Therefore, the energy storage device of the present disclosure can overcome the problems of the conventional energy storage device due to unstoppable switching between the operation modes.

Generally, the inductor current $I_L$ will flow from the energy storage unit 13 to the second switch Q2 if the duty cycle adjustment unit 121 allows the negative current in buck mode. The negative current flows into the ground terminal through the second switch Q2 to cause the poor charging efficiency of the energy storage unit 13. Moreover, the negative current may also flow into the adapter 11 to damage the adapter 11. However, in the present embodiment, the negative current is only allowed when the input current $I_{CIC}$ is higher than or equal to the maximum safe current $I_{max}$. Moreover, the charger module 12 controls the duty cycle of the first switch Q1 and the duty cycle of the second switch Q2 to let the energy storage unit 13 assist in providing the electronic device 2 with energy.

Figure 4:
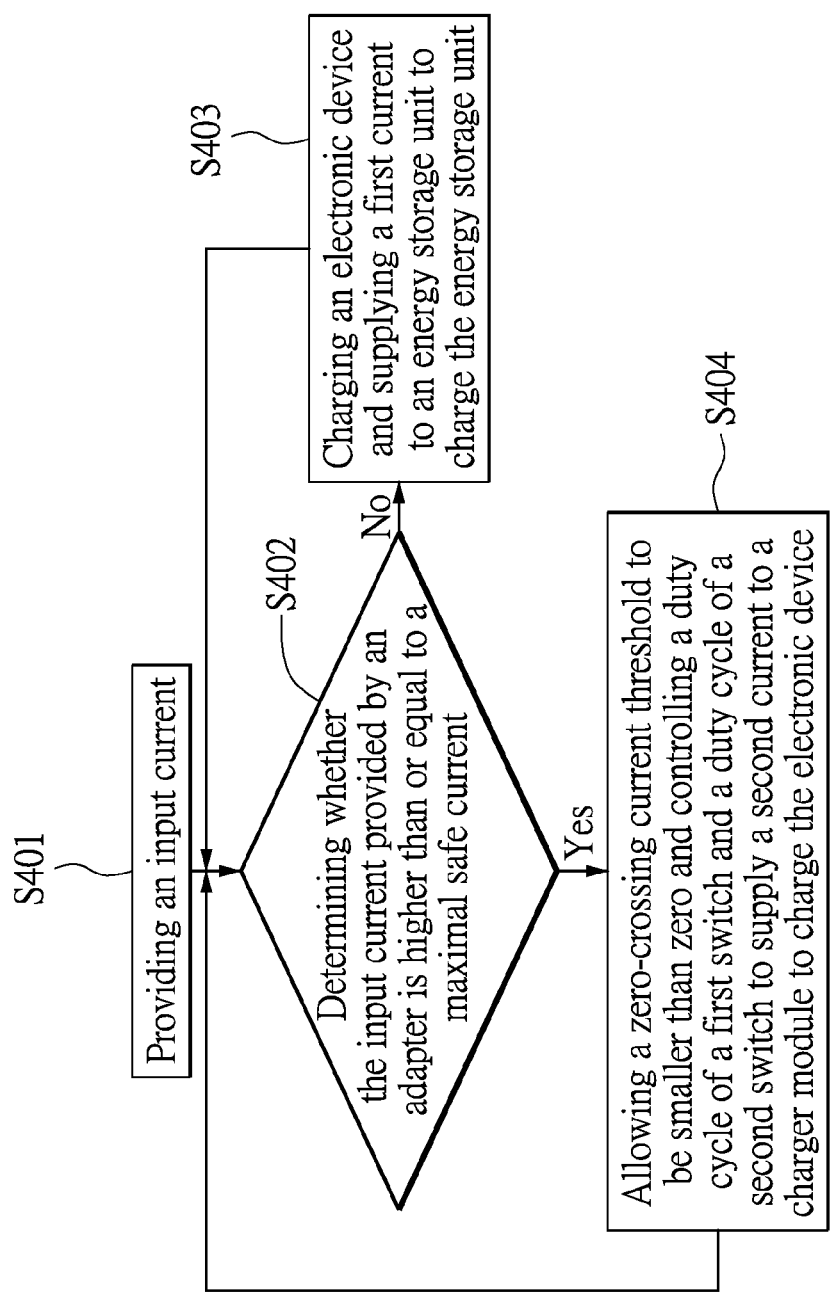
FIG. 4 is a flowchart of a control method of an energy storage device according to one embodiment of the present disclosure.

Then, referring to FIG. 4, FIG. 4 is a flowchart of a control method of an energy storage device according to one embodiment of the present disclosure. The control method is used with the energy storage device 1. In Step S401, the adapter receives electricity from the utility and starts to provide an input current $I_{CIC}$. In Step S402, the detection unit detects the input current $I_{CIC}$ provided by the adapter and determines whether the input current $I_{CIC}$ is higher than or equal to a maximum safe current $I_{MAX}$ of the adapter. When the input current $I_{CIC}$ provided by the adapter is higher than or equal to the maximum safe current $I_{MAX}$, the method proceeds with Step S404. Otherwise, when the input current $I_{CIC}$ provided by the adapter is lower than the maximum safe current $I_{MAX}$, the method proceeds with Step S403.

In Step S403, the charger module operates in a buck mode. The adapter supplies the input current to the electronic device to charge the electronic device. Moreover, the adapter supplies a first current to an energy storage unit to charge the energy storage unit. In other words, the adapter provides the electronic device and the energy storage unit with energy at the same time. The inner current of the energy storage device is expressed as: $I_{CIC}=I_{SYS}+I1$. Then, the method repeats Step S402 to continue detecting the change in the input current.

In Step S404, the charger module allows the zero-crossing current threshold $I_{ZC}$ to be lower than zero. In other words, the charger module allows the negative current. The duty cycle adjustment unit in the charger module adjusts the duty cycle of the first switch and the duty cycle of the second switch so that the energy storage unit supplies a second current to the charger module. The second current is reverse to the first current. Then, the charger module provides the electronic device with sufficient energy according to the second current. Accordingly, the charger module provides the electronic device with sufficient energy without damaging the adapter. The inner current of the energy storage device is expressed as: $I_{CIC}+I2=I_{sys}$. Then, the method repeats Step S402 to continue detecting the change in the input current.

As stated above, the present disclosure provides an energy storage device and a control method thereof, using a control charger module to achieve assisting the adapter to charge the electronic device. Therefore, the energy storage device according to the present disclosure does not require a buck circuit and a boost circuit as in the conventional energy storage device. Compared to the conventional energy storage device operating based on a control signal to control the switching between the buck circuit and the boost circuit, the energy storage device according to the present disclosure does not require the switching between the buck circuit and the boost circuit to respond to the request of an electronic device. In other words, the energy storage device according to the present disclosure exhibits less response time and good stability of operation.

Moreover, the charger module according to one embodiment of the present disclosure can operate in the buck mode and the boost mode to achieve the buck and the boost function of the conventional energy storage device. Compared to the conventional energy storage device, the energy storage device of the present disclosure has advantages of lower manufacturing cost, easier circuit design and less circuit area.

Moreover, the energy provided by the energy storage unit in the energy storage device of the present disclosure is adjustable. The energy storage device dynamically controls the energy supplied by the energy storage unit to the electronic device according to the load current required by the electronic device. Accordingly, the energy storage device of the present disclosure can overcome the problems of the conventional energy storage device due to unstoppable switching between the operation modes.

Moreover, the energy storage device 1 according to one embodiment of the present disclosure adjusts the energy provided by the energy storage unit 13 and the input current $I_{CIC}$ provided by the adapter 11 according to the present requirement of the electronic device 2. Furthermore, when the load current required by the electronic device 2 is too high, the energy storage unit 13 starts to provide the electronic device 2 with electricity and the adapter 11 adjusts the input current $I_{CIC}$ to be equal to the maximum safe current $I_{max}$. Therefore, the energy storage device of the present disclosure can overcome the problems of the conventional energy storage device due to unstoppable switching between the operation modes.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An energy storage device comprising at least one energy input interface and at least one energy output interface, wherein said energy storage device receives energy using said at least one energy input interface or charges an electronic device using said at least one energy output interface, said energy storage device comprising:
    an adapter coupled to said at least one energy input interface to provide an input current;
    an energy storage unit for storing energy or providing energy; and
    a charger module coupled to said adapter, said energy storage unit and said at least one energy output interface to receive said input current so that said charger module supplies a first current to said energy storage unit to charge said energy storage unit or said charger module supplies said input current to said electronic device to charge said electronic device, wherein said charger module comprises:
        a first switch coupled to said adapter, said energy storage unit and said at least one energy output interface; and
        a second switch coupled to said first switch, said energy storage unit and a ground terminal, wherein said charger module allows a current flowing through said second switch to be smaller than zero;
    wherein, when said input current provided by said adapter is higher than or equal to a maximum safe current, said charger module controls a duty cycle of said first switch and a duty cycle of said second switch so that said energy storage unit supplies a second current to said charger module and then said charger module operates in a boost mode and outputs energy to said electronic device according to said second current to assist said adapter to charge said electronic device, wherein said duty cycle of said first switch and said duty cycle of said second switch correspond to said first current and said second current, and said second current is reverse to said first current.

2. The energy storage device of claim 1, wherein, in said boost mode, said adapter adjusts said input current to be equal to said maximum safe current to prevent said adapter from being damaged due to too high energy output.

3. The energy storage device of claim 1, wherein said first switch is a PMOSFET, and said second switch is an NMOSFET.

4. The energy storage device of claim 1, wherein said charger module further comprises:
    a detection unit coupled to said adapter to detect said input current; and
    a duty cycle adjustment unit coupled to said detection unit, a gate of said first switch and a gate of said second switch to adjust said duty cycle of said first switch and said duty cycle of said second switch, wherein said duty cycle adjustment unit outputs a first PWM signal corresponding to said first switch;
    wherein, when said detection unit detects that said input current is higher than said maximum safe current of said adapter, said duty cycle adjustment unit adjusts said first PWM signal so that a first turn-on time of said first switch is shortened and said first current decreases gradually.

5. The energy storage device of claim 4, wherein said duty cycle adjustment unit outputs a second PWM signal corresponding to said second switch and controls a second turn-on time of said second switch to be longer than said first turn-on time so that said second current increases gradually.

6. The energy storage device of claim 4, wherein said detection unit is further coupled to said energy storage unit to detect a present electric capacity of said energy storage unit, said first current and said second current and adjust said duty cycle of said first switch and said duty cycle of said second switch.

7. The energy storage device of claim 5, wherein, when said input current provided by said adapter decreases to lower than said maximum safe current, said energy storage device operates in a buck mode, wherein, in said buck mode, said adapter charges said energy storage unit and said electronic device simultaneously.

8. A control method of an energy storage device, said energy storage device comprising at least one energy input interface and at least one energy output interface so as to receive energy using said at least one energy input interface or charge an electronic device using said at least one energy output interface, said control method comprising steps of:
    Step A: providing an input current using an adapter;
    Step B: determining whether said input current provided by said adapter is higher than or equal to a maximum safe current of said adapter;
    step C: when said input current provided by said adapter is lower than said maximum safe current, using a charger module to charge said electronic device and supply a first current to an energy storage unit to charge said energy storage unit, wherein said charger module comprises a first switch and a second switch;
    step D: when said input current provided by said adapter is higher than or equal to said maximum safe current, allowing a current flowing through said second switch to be smaller than zero and controlling a duty cycle of said first switch and a duty cycle of said second switch so that said energy storage unit supplies a second current to said charger module and then said charger module outputs energy to said electronic device according to said second current to assist said adapter to charge said electronic device, wherein said duty cycle of said first switch and said duty cycle of said second switch correspond to said first current and said second current, and said second current is reverse to said first current.

9. The control method of claim 8, wherein, in step D, said adapter adjusts said input current to be equal to said maximum safe current to prevent said adapter from being damaged due to too high energy output.

10. The control method of claim 8, wherein said first switch is a PMOSFET, and said second switch is an NMOSFET.

11. The control method of claim 8, wherein in step D, when a detection unit of said charger module detects that said input current is higher than or equal to said maximum safe current, a duty cycle adjustment unit of said charger module adjusts a first PWM signal corresponding to said first switch so that a first turn-on time of said first switch is shortened and said first current decreases gradually.

12. The control method of claim 11, wherein said duty cycle adjustment unit outputs a second PWM signal corresponding to said second switch and controls a second turn-on time of said second switch to be longer than said first turn-on time so that said second current increases gradually.

13. The control method of claim 11, wherein said detection unit is further configured to detect a present electric capacity of said energy storage unit, said first current and said second current and to adjust said duty cycle of said first switch and said duty cycle of said second switch.

14. The control method of claim 11, wherein, when said input current provided by said adapter decreases to lower than said maximum safe current, said energy storage device operates in a buck mode, wherein, in said buck mode, said adapter charges said energy storage unit and said electronic device simultaneously.

* * * * *